United States Patent
Mohmeyer et al.

(10) Patent No.: US 9,023,908 B2
(45) Date of Patent: May 5, 2015

(54) OIL-ABSORBENT POLYURETHANE SPONGES WITH GOOD MECHANICAL PROPERTIES

(75) Inventors: Nils Mohmeyer, Osnabrück (DE); Ralf Fritz, Bissendorf-Schledehausen (DE); Bernd Bruchmann, Freinsheim (DE); Anna Cristadoro, Heppenheim (DE); Marcus Leberfinger, Georgsmarienhütte (DE); Antje van der Net, Kassel (DE)

(73) Assignee: BASF SE, Ludwigshafen (DE)

( * ) Notice: Subject to any disclaimer, the term of this patent is extended or adjusted under 35 U.S.C. 154(b) by 693 days.

(21) Appl. No.: 13/114,500

(22) Filed: May 24, 2011

(65) Prior Publication Data

US 2011/0293374 A1    Dec. 1, 2011

Related U.S. Application Data

(60) Provisional application No. 61/348,828, filed on May 27, 2010.

(51) Int. Cl.
| | | |
|---|---|---|
| C08G 18/28 | (2006.01) | |
| C02F 1/68 | (2006.01) | |
| C08G 18/12 | (2006.01) | |
| C08G 18/42 | (2006.01) | |
| C08G 18/44 | (2006.01) | |
| C08G 18/66 | (2006.01) | |
| C08G 18/79 | (2006.01) | |
| C02F 1/28 | (2006.01) | |
| C02F 101/32 | (2006.01) | |
| C08G 101/00 | (2006.01) | |

(52) U.S. Cl.
CPC ............ *C02F 1/681* (2013.01); *C02F 1/285* (2013.01); *C02F 2101/32* (2013.01); *C08G 18/12* (2013.01); *C08G 18/4202* (2013.01); *C08G 18/4252* (2013.01); *C08G 18/44* (2013.01); *C08G 18/664* (2013.01); *C08G 18/797* (2013.01); *C08G 2101/0008* (2013.01); *C08G 2101/0058* (2013.01); *C08G 2101/0083* (2013.01)

(58) Field of Classification Search
USPC ......... 521/130, 159, 170, 172, 173, 174, 176; 405/52, 63; 210/693
See application file for complete search history.

(56) References Cited

U.S. PATENT DOCUMENTS

| | | | |
|---|---|---|---|
| 3,304,273 A | | 2/1967 | Stamberger |
| 3,383,351 A | | 5/1968 | Stamberger |
| 3,523,093 A | | 8/1970 | Stamberger |
| 4,764,537 A | | 8/1988 | Horn et al. |
| 6,331,577 B1 * | 12/2001 | Volkert et al. .................. 521/159 |
| 2003/0138621 A1 * | 7/2003 | Bollmann et al. .......... 428/318.6 |
| 2007/0185223 A1 * | 8/2007 | Ortalda ........................ 521/172 |
| 2011/0021652 A1 * | 1/2011 | Mohmeyer et al. ........... 521/155 |
| 2011/0269863 A1 * | 11/2011 | Kunst et al. ................... 521/172 |

FOREIGN PATENT DOCUMENTS

| | | |
|---|---|---|
| DE | 111394 | 7/1900 |
| DE | 1 152 536 | 8/1963 |
| DE | 1 152 537 | 8/1963 |
| DE | 27 38 268 | 3/1979 |
| DE | 36 07 447 A1 | 9/1987 |
| EP | 0 153 639 A2 | 9/1985 |
| EP | 0 250 351 A2 | 12/1987 |
| WO | WO 2005/026234 A1 | 3/2005 |
| WO | WO 2005/074583 A2 | 8/2005 |
| WO | WO 2005/098763 A2 | 10/2005 |
| WO | WO 2008/043545 A1 | 4/2008 |
| WO | WO 2008/071622 A1 | 6/2008 |
| WO | WO 2009/112576 A1 | 9/2009 |

OTHER PUBLICATIONS

U.S. Appl. No. 13/440,463, filed Apr. 5, 2012, Henningsen, et al.

* cited by examiner

*Primary Examiner* — John Cooney
(74) *Attorney, Agent, or Firm* — Oblon, McClelland, Maier & Neustadt, L.L.P.

(57) ABSTRACT

The present invention relates to a method for adsorbing and/or absorbing oil, by bringing oil into contact with a polyurethane sponge with excellent mechanical properties.

16 Claims, No Drawings

OIL-ABSORBENT POLYURETHANE SPONGES WITH GOOD MECHANICAL PROPERTIES

The present invention relates to a method for adsorbing and/or absorbing oil, by bringing oil into contact with a polyurethane sponge having excellent mechanical properties.

It is known that specific open-cell polyurethane sponges are suitable for adsorbing hydrophobic liquids. By way of example, Angewandte Makromolekulare Chemie, 78 (1979), pages 67 to 74, describes the use of polyurethane foams as filter materials for separating hydrophobic liquids from mixtures of hydrophobic and hydrophilic liquids. Said article indeed discloses the possibility of selective displacement by the hydrophobic liquid of water comprised within the cells of the foam. The hydrophobicity of the surface of the polyurethane here significantly affects the ad- or absorbency of the polyurethane foam. This hydrophobicity can by way of example be achieved by incorporating, into the main structure of the polyurethane, monomers having long hydrocarbon radicals.

DE 2738268 describes polyurethane foams for adsorbing oil, these being obtained via addition of lipophilic compounds, for example fatty acids, to the conventional structural components of the polyurethane. The lipophilic component used in the examples comprises 43.3 parts by weight, based on the polyol component, of a reaction product of oleic acid and diethanolamine.

A significant problem with known hydrophobic polyurethane foams is that they have poor mechanical stability. Foams of this type can therefore be used only as insert materials in filters. Because these materials lack the necessary mechanical stability, they cannot be used to clean bodies of water, such as rivers, lakes, or marine waters. Wave action leads to break-up of the foam, and the result of inadequate rebound resilience combined with insufficient compressive strength is undesired release of the oil—even on exposure to small stresses, for example withdrawal of the foam from the water. The fine-cell nature of the known foams also prevents absorption of oils other than those with low viscosity.

However, another problem is that the polyurethane material is often attacked by the oil, for example with swelling of the material, with resultant drastic impairment of mechanical properties.

WO 2008043545 describes an oil-absorbing polyurethane foam which is obtained by using a polyester based on a difunctional fatty acid, as compound reactive toward isocyanates. The product here is a foam which exhibits a certain degree of mechanical stability and which is not destroyed merely by wave action. The average cell size of said foam is preferably about 1 mm, and absorption of oils can therefore begin at relatively high viscosity. The mechanical stability, in particular rebound resilience, tensile strength, and tear propagation resistance, of the polyurethane foam nevertheless remains unsatisfactory for applications in open bodies of water, e.g. rivers, lakes, and marine environments.

WO 2005074583 discloses an oil-adsorbing polyurethane foam, the surface of which is coated with a hydrophobic polyurethane material. Although this method permits the use of any desired polyurethane foams with known mechanical properties for oil adsorption, the additional coating step makes the production process complicated and expensive.

It was therefore an object of the present invention to provide a method for absorbing hydrophobic liquids which does not have the disadvantages mentioned.

The object of the invention was achieved via a method in which the hydrophobic liquid is brought into contact with an oil-absorbing polyurethane foam which has excellent mechanical properties.

The polyurethane foam of the invention has a density from 70 to 300 $g/dm^3$, from 1 to 20 cells per cm, rebound resilience greater than 30%, elongation at break greater than 200%, tear propagation resistance greater than 1.2 N/mm, compressive strength greater than 4 kPa, and tensile strength greater than 200 kPa. The open-cell factor to DIN ISO 4590 of the polyurethane foam of the invention is moreover at least 50%, preferably from 70% to 99.9%, particularly preferably from 85% to 99%, and in particular from 90 to 98%. Polyurethane foams of this type are described in WO 2009/112576. Hydrophobic groups are used there to improve oil-absorbency. Said hydrophobic groups can either be subsequently applied in the form of a coating to the foam or are preferably comprised beforehand within a component for producing the polyurethane.

The polyurethane foams of the invention can be produced by various methods. Methods of this type are described in WO 2009/112576. Said foams can optionally be hydrophobicized subsequently by known prior-art methods. A method for applying a hydrophobic coating is described by way of example in WO 2005/074583. It is preferable that the polyurethane of the polyurethane foams of the invention requires no further treatment in order to have sufficient hydrophobicity for oil absorption. This is achieved by way of example if the components for production of the polyurethane have at least one hydrophobic group, for example one aliphatic, araliphatic, cycloaliphatic, or aromatic hydrocarbon radical having at least 8 carbon atoms. Methods for producing polyurethane foams of the invention which require no further treatment in order to have sufficient hydrophobicity for oil absorption are described via the embodiments described below.

In a first embodiment, the open-cell polyurethane foams of the invention are obtained via a method in which a) compounds which have isocyanate groups and which are based on a1) MDI and optionally a2) polyetherols, and/or on a3) polyesterols, where the content of MDI having a functionality greater than 2 is smaller than 30% by weight, based on the total weight of the MDI a1), b) relatively high-molecular-weight compounds having groups reactive toward isocyanate, comprising polyetherols and/or polyesterols, c) blowing agent comprising water and also optionally d) chain extender, e) catalyst, and also f) other auxiliaries and/or additives are mixed to give a reaction mixture and are permitted to complete reaction to give the polyurethane foam, where the relatively high-molecular-weight compound b) used comprises a mixture comprising polyester polyol and hydrophobic, hyperbranched polyester.

In a second embodiment, the open-cell polyurethane foams of the invention are obtained via a method in which a) compounds which have isocyanate groups and which are based on a1) MDI and optionally on a2) polyetherols, and/or on a3) polyesterols, where the content of MDI having a functionality greater than 2 is smaller than 30% by weight, based on the total weight of the MDI a1), b) relatively high-molecular-weight compounds having groups reactive toward isocyanate, comprising polyetherols and/or polyesterols, c) blowing agent comprising water and also optionally d) chain extender, e) catalyst, and also f) other auxiliaries and/or additives are mixed to give a reaction mixture and are permitted to complete reaction to give the polyurethane foam, where the relatively high-molecular-weight compound b) used comprises a mixture comprising polyester polyol and hydrophobic, hyperbranched polycarbonate.

The compounds which are used to produce the polyurethane foams of the invention and which have isocyanate groups comprise compounds based on a1) diphenylmethane diisocyanate (hereinafter termed MDI), where the content of MDI having functionality greater than 2 is smaller than 30% by weight, preferably smaller than 20% by weight, and in particular smaller than 10% by weight, based on the total weight of the MDI. Examples are diphenylmethane 4,4'-diisocyanate, diphenylmethane 2,4'-diisocyanate, and the mixtures of monomeric diphenylmethane diisocyanates and of homologs of diphenylmethane diisocyanate having a higher number of rings (polymer MDI). It is preferable to use 4,4'-MDI. The 4,4'-MDI preferably used can comprise from 0 to 20% by weight of 2,4'-MDI and small amounts, up to about 10% by weight, of allophanate-, carbodiimide-, or uretonimine-modified MDI. It is also possible to use small amounts of polyphenylene polymethylene polyisocyanate (polymer MDI). The material can optionally also comprise other isocyanates alongside MDI, examples being tolylene diisocyanate, isophorone diisocyanate, or hexamethylene diisocyanate, in small amounts. It is preferable that the material comprises no isocyanates other than MDI and its derivatives.

The compounds (a) having isocyanate groups are preferably used in the form of polyisocyanate prepolymers. Said polyisocyanate prepolymers are obtainable by reacting MDI (a-1) described above with polyetherols (a2) and/or with polyesterols (a3), for example at temperatures of from 30 to 100° C., preferably at about 80° C., to give the prepolymer. The polyetherols (a2) and polyesterols (a3) used preferably comprise the polyetherols and polyesterols described under b). Materials that can be used here comprise not only polyisocyanate prepolymers based on polyether, and also polyisocyanate prepolymers based on polyester, and mixtures of these, but also polyisocyanate prepolymers based on polyethers and on polyesters, and also mixtures of these with the abovementioned polyisocyanate prepolymers. The compound a) used which has isocyanate groups preferably comprises polyisocyanate prepolymers based on polyether, or else a mixture of polyisocyanate prepolymers based on polyether and polyisocyanate prepolymers based on polyester. The NCO content of the prepolymers here is preferably in the range from 6 to 30% by weight, particularly preferably from 10 to 28% by weight, and in particular from 13 to 25% by weight.

Conventional chain extenders (a4) are optionally added to the polyols mentioned during production of the isocyanate prepolymers. These substances are described under d) below.

The polyisocyanate a) used preferably comprises a compound based on a1) MDI and a2) polyesterol. The polyisocyanate a) used particularly preferably comprises a compound based on a1) MDI and a2) polyetherol, and comprises a compound based on a1) MDI and a2) polyesterol. The ratio by weight of compound based on a1) MDI and a2) polyetherol and compound based on a1) MDI and a3) polyesterol here is preferably from 35:65 to 70:30.

The relatively high-molecular-weight compounds used which have groups reactive toward isocyanate, comprising polyetherols and/or polyesterols, b), can comprise compounds having molar mass greater than 450 g/mol and having groups reactive toward isocyanates. It is preferable to use polyetherols and/or polyesterols.

Polyetherols are produced by known methods, for example via anionic polymerization using alkali metal hydroxides or alkali metal alcoholates as catalysts and with addition of at least one starter molecule which mostly comprises from 2 to 3 reactive hydrogen atoms, or via cationic polymerization using Lewis acids, such as antimony pentachloride or boron trifluoride etherate, starting from one or more alkylene oxides having from 2 to 4 carbon atoms in the alkylene radical. Examples of suitable alkylene oxides are tetrahydrofuran, propylene 1,3-oxide, butylene 1,2- or 2,3-oxide, and preferably ethylene oxide and propylene 1,2-oxide. Other catalysts that can also be used are multimetal cyanide compounds, known as DMC catalysts. The alkylene oxides can be used individually, in alternating succession, or in the form of a mixture. It is preferable that the polyether polyols comprise at least 75% of propylene oxide. If the polyether polyol is used for producing polyisocyanate prepolymers, it is preferable that propylene oxide is the only alkylene oxide used for producing the polyether polyols.

Starter molecules that can be used comprise water or di- and trifunctional alcohols, such as ethylene glycol, 1,2- and 1,3-propanediol, diethylene glycol, dipropylene glycol, 1,4-butanediol, glycerol, or trimethylolpropane.

The functionality of the polyether polyols, preferably polyoxypropylene polyoxyethylene polyols, is preferably smaller than 4, preferably from 1.7 to 3, particularly preferably from 2 to 2.7, while the molar masses of these are from 450 to 12 000 g/mol, preferably from 500 to 12 000 g/mol, particularly preferably from 700 to 8000 g/mol, and in particular from 900 to 3000 g/mol.

By way of example, polyester polyols can be produced from organic dicarboxylic acids having from 2 to 12 carbon atoms, preferably from aliphatic dicarboxylic acids having from 4 to 6 carbon atoms, and from polyfunctional alcohols, preferably diols, having from 2 to 12 carbon atoms, preferably from 2 to 6 carbon atoms. Examples of dicarboxylic acids that can be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids here can be used either individually or else in a mixture with one another. Instead of the free dicarboxylic acids, it is also possible to use the corresponding dicarboxylic acid derivatives, e.g. dicarboxylic esters of alcohols having from 1 to 4 carbon atoms, or dicarboxylic anhydrides. It is preferable to use dicarboxylic acid mixtures composed of succinic, glutaric, and adipic acid in quantitative proportions of, for example, from 20 to 35:from 35 to 50:from 20 to 32 parts by weight, and in particular adipic acid. Examples of di- and polyfunctional alcohols, in particular diols, are: ethanediol, diethylene glycol, 1,2- or 1,3-propanediol, dipropylene glycol, tripropylene glycol, 1,4-butanediol, 1,5-pentanediol, 3,3-dimethylpentane-1,5-diol, 1,6-hexanediol, 1,10-decanediol, glycerol, and trimethylolpropane. It is preferable to use ethanediol, diethylene glycol, 1,4-butanediol, 1,5-pentanediol, and 1,6-hexanediol. It is also possible to use polyester polyols derived from lactones, e.g. □-caprolactone, or hydroxycarboxylic acids, e.g. □-hydroxycaproic acid.

It is particularly preferable to produce polyesterols by using adipic acid, a diol selected from monoethylene glycol, diethylene glycol, and butanediol, or from a mixture of these, and optionally glycerol and/or trimethylolpropane, where the molar amount of the diols is greater than that of the triols.

For production of the polyester polyols, the organic, e.g. aromatic, and preferably aliphatic, polycarboxylic acids and/or their derivatives and polyfunctional alcohols can be polycondensed without a catalyst or preferably in the presence of esterification catalysts, advantageously in an atmosphere composed of inert gas, e.g. nitrogen, carbon monoxide, helium, argon, etc., in the melt at temperatures of from 150 to 250° C., preferably from 180 to 220° C., optionally at subatmospheric pressure, until the desired acid number which is preferably smaller than 10, particularly preferably smaller than 2, has been reached. In one preferred embodiment, the esterification mixture is polycondensed at atmospheric pressure at the abovementioned temperatures until an acid number of from 80 to 30, preferably from 40 to 30, has been reached, and then polycondensed at a pressure smaller than 500 mbar, preferably from 50 to 150 mbar. Examples of esterification catalysts that can be used are iron catalyst, cadmium catalyst, cobalt catalyst, lead catalyst, zinc catalyst, antimony catalyst, magnesium catalyst, titanium catalyst, and tin catalyst, in the form of metals, or of metal oxides, or of metal salts. However, the polycondensation reaction can also be carried out in the liquid phase in the presence of diluents and/or entrainers, e.g. benzene, toluene, xylene, or chlorobenzene, for azeotropic removal of the water of condensation by distillation. For the production of polyester polyols, the molar ratio of the organic polycarboxylic acids and/or their derivatives and polyfunctional alcohols advantageously polycondensed is from 1 from 1 to 1.8, preferably 1: from 1.05 to 1.2. It is also optionally possible to add conventional monoacids as chain terminators during the condensation reaction. The functionality of the resultant polyester polyols is preferably from 1.8 to 4, in particular from 2 to 3, while the molar mass of these is from 480 to 3000 g/mol, preferably from 1000 to 3000 g/mol.

Other suitable relatively high-molecular-weight compounds b) which have at least two hydrogen atoms reactive toward isocyanate are polymer-modified polyols, preferably polymer-modified polyesterols or polyetherols, particularly preferably graft polyetherols or graft polyesterols, in particular graft polyetherols. These are what is known as a polymer polyol, usually having from 5 to 60% by weight, preferably from 10 to 55% by weight, particularly preferably from 30 to 55% by weight, and in particular from 40 to 50% by weight, content of preferably thermoplastic polymers. These polymer polyesterols are described by way of example in WO 05/098763 and EP-A 250 351, and are usually produced via free-radical polymerization of suitable olefinic monomers, such as styrene, acrylonitrile, (meth)acrylates, (meth)acrylic acid, and/or acrylamide, in a polyesterol serving as graft base. The side chains are generally produced via transfer of the free radicals from growing polymer chains to polyesterols or polyetherols. The polymer polyol comprises, alongside the graft copolymer, mainly the homopolymers of the olefins, dispersed in unaltered polyesterol or polyetherol.

In one preferred embodiment, the monomers used comprise acrylonitrile, styrene, or acrylonitrile and styrene, particularly preferably an excess of styrene. The monomers are optionally polymerized in the presence of further monomers, of a macromer, and of a moderator, and with use of a free-radical initiator, mostly azo compounds or peroxide compounds, in a polyesterol or polyetherol as continuous phase. This process is described by way of example in DE 111 394, U.S. Pat. No. 3,304,273, U.S. Pat. No. 3,383,351, U.S. Pat. No. 3,523,093, DE 1 152 536, and DE 1 152 537.

During the free-radical polymerization reaction, the macromers are concomitantly incorporated into the copolymer chain. Block copolymers having a polyester block or polyether block and a polyacrylonitrile-styrene block are thus formed and act as compatibilizer at the interface between continuous phase and disperse phase and suppress agglomeration of the polymer polyesterol particles. The proportion of the macromers is usually from 1 to 20% by weight, based on the total weight of the monomers used for production of the polymer polyol.

If the relatively high-molecular-weight compound b) comprises polymer polyol, this is preferably present together with other polyols, such as polyetherols, polyesterols, or a mixture of polyetherols and polyesterols. By way of example, the material can comprise an amount, based on the total weight of component (b), of from 7 to 90% by weight, or from 11 to 80% by weight, of the polymer polyols. The polymer polyol is particularly preferably polymer polyesterol or polymer polyetherol.

The relatively high-molecular-weight compounds b) can also comprise urea and its polymer derivatives in dispersed form.

The relatively high-molecular-weight compound b) used preferably comprises, alongside hyperbranched polyesterols or hyperbranched polycarbonate, mainly, and particularly preferably exclusively, one or more polyesterols.

The average functionality of the compounds a2), a3), and b) is smaller than 2.4, preferably smaller than 2.3, and particularly preferably from 1.7 to 2.2.

Blowing agents (c) comprising water are moreover present during production of polyurethane foams. Blowing agents (c) that can be used comprise not only water but also well-known compounds having chemical and/or physical action. Chemical blowing agents are compounds which form gaseous products through reaction with isocyanate, an example being water or formic acid. Physical blowing agents are compounds which have been emulsified or dissolved in the starting materials for polyurethane production and which vaporize under the conditions of polyurethane formation. By way of example, these are hydrocarbons, halogenated hydrocarbons, and other compounds, e.g. perfluorinated alkanes, such as perfluorohexane, fluorochlorocarbons, and ethers, esters, ketones, and acetals, and also inorganic and organic compounds which liberate nitrogen on heating, or a mixture thereof, for example (cyclo)aliphatic hydrocarbons having from 4 to 8 carbon atoms, or fluorochlorocarbons such as Solkane® 365 mfc from Solvay Fluorides LLC. In one preferred embodiment, the blowing agent used comprises a mixture comprising at least one of said blowing agents and water, or in particular water as sole blowing agent.

The amounts used here of blowing agent are such that the density of the polyurethane foam of the invention is from 70 to 300 g/dm$^3$. If water is used as sole blowing agent, the content of water is usually within the range from 0.4 to 2% by weight, preferably from 0.6 to 1.8% by weight, particularly preferably from 0.8 to 1.5% by weight, based on the total weight of components (b) to (f).

The chain extenders (d) used comprise substances having a molar mass which is preferably smaller than 450 g/mol, particularly preferably from 60 to 400 g/mol, and chain extenders here have 2 hydrogen atoms reactive toward isocyanates. These can be used individually or preferably in the form of a mixture. It is preferable to use diols having molecular weights smaller than 400, particularly preferably from 60 to 300, and in particular from 60 to 150. Examples of compounds that can be used are aliphatic, cycloaliphatic, and/or araliphatic diols having from 2 to 14, preferably from 2 to 10, carbon atoms, e.g. ethylene glycol, 1,3-propanediol, pentanediol, tripropylene glycol, 1,10-decanediol, 1,2-, 1,3-, or 1,4-dihydroxycyclohexane, diethylene glycol, dipropylene glycol, and preferably 1,4-butanediol, 1,6-hexanediol, and bis(2-hydroxyethyl)hydroquinone, and low-molecular-weight polyalkylene oxides which contain hydroxy groups and which are based on ethylene oxide and/or on propylene 1,2-oxide, and on the abovementioned diols as starter molecules. The chain extenders (d) particularly preferably used comprise monoethylene glycol, 1,4-butanediol, or a mixture thereof.

Other compounds that can optionally also be used alongside chain extenders are crosslinking agents. These are substances having molar mass smaller than 450 g/mol and having 3 hydrogen atoms reactive toward isocyanate, examples being triols, such as 1,2,4- and 1,3,5-trihydroxycyclohexane, glycerol, and trimethylolpropane, or low-molecular-weight polyalkylene oxides which contain hydroxy groups and which are based on ethylene oxide and/or on propylene 1,2-oxide, and on the abovementioned triols as starter molecules. It is preferable that no crosslinking agents are used in the second to fifth embodiment.

If chain extenders (d) are used, the amounts that can advantageously be used of these are from 1 to 60% by weight, preferably from 1.5 to 50% by weight, and in particular from 2 to 40% by weight, based on the weight of components (b) to (f).

Catalysts (e) used for production of the polyurethane foams preferably comprise compounds which markedly accelerate the reaction of the compounds of comprising hydroxy groups the component (b), (c), and optionally (d) with the compounds (a) having isocyanate groups. Examples that may be mentioned are amidines, such as 2,3-dimethyl-3,4,5,6-tetrahydropyrimidine, tertiary amines, such as triethylamine, tributylamine, dimethylbenzylamine, N-methyl-, N-ethyl-, or N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyl-diaminoethyl ether, urea, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds, such as triethanolamine, triisopropanolamine, N-methyl- and N-ethyldiethanolamine, and dimethylethanolamine. Organometallic compounds can also be used, preferably organotin compounds, such as stannous salts of organic carboxylic acids, e.g. stannous acetate, stannous octoate, stannous ethylhexoate, and stannous laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) is an ester, it is preferable to use exclusively amine catalysts.

It is preferable to use from 0.001 to 5% by weight, in particular from 0.05 to 2% by weight, of catalyst or catalyst combination, based on the weight of component (b).

The reaction mixture for producing the polyurethane foams can optionally also receive additions of auxiliaries and/or additives (f). Mention may be made by way of example of surfactants, foam stabilizers, cell regulators, other release agents, fillers, dyes, pigments, hydrolysis stabilizers, odor-absorbing substances, and fungistatic and/or bacteriostatic substances.

Examples of surfactants that can be used are compounds which serve to promote the homogenization of the starting materials and are optionally also suitable for regulating the cell structure. Examples that may be mentioned are emulsifiers, such as the sodium salts of castor oil sulfates or of fatty acids, and also salts of fatty acids with amines, e.g. diethylamine oleate, diethanolamine stearate, diethanolamine ricinolate, salts of sulfonic acids, e.g. the alkali metal or ammonium salts of dodecylbenzene- or dinaphthylmethanedisulfonic acid, and ricinoleic acid; foam stabilizers, such as siloxane-oxalkylene copolymers and other organopolysiloxanes, ethoxylated alkylphenols, ethoxylated fatty alcohols, paraffin oils, castor oil esters or ricinoleic esters, Turkey red oil, and peanut oil, and cell regulators, such as paraffins, fatty alcohols, and dimethylpolysiloxanes. For improvement of emulsifying action, or the cell structure, and/or stabilization of the foam, other suitable substances are oligomeric acrylates having polyoxyalkylene and fluoroalkane radicals as side groups. The amounts usually used of the surfactants are from 0.01 to 5 parts by weight, based on 100 parts by weight of component (b).

Examples that may be mentioned of suitable other release agents are: reaction products of fatty esters with polyisocyanates, salts derived from polysiloxanes comprising amino groups and fatty acids, salts derived from saturated or unsaturated (cyclo)aliphatic carboxylic acids having at least 8 carbon atoms and tertiary amines, and also in particular internal lubricants, e.g. carboxylic esters and/or carboxamides, produced via esterification or amidation of a mixture composed of montanic acid and of at least one aliphatic carboxylic acid having at least 10 carbon atoms with at least dibasic alkanolamines, polyols, and/or polyamines whose molar masses are from 60 to 400 g/mol, as disclosed by way of example in EP 153 639, or with a mixture composed of organic amines, metal stearates, and organic mono- and/or dicarboxylic acids or their anhydrides, as disclosed by way of example in DE-A 36 07 447, or a mixture composed of an imino compound, of a metal carboxylate and optionally of a carboxylic acid, as disclosed by way of example in U.S. Pat. No. 4,764,537. It is preferable that reaction mixtures of the invention do not comprise any other release agents.

Fillers, in particular reinforcing fillers, are the usual organic and inorganic fillers, reinforcing agents, weighting agents, coating agents, etc. that are known per se. Individual fillers that may be mentioned by way of example are: inorganic fillers, such as volcanic rock, silicatic minerals, such as phyllosilicates, e.g. antigorite, bentonite, serpentine, hornblendes, amphiboles, chrysotile, and talc, metal oxides, e.g. kaolin, aluminum oxides, titanium oxides, zinc oxide, and iron oxides, metal salts, e.g. chalk and baryte, and inorganic pigments, e.g. cadmium sulfide, and zinc sulfide, and also glass, etc. It is preferable to use kaolin (China clay), aluminum silicate, and coprecipitates made of barium sulfate and aluminum silicate, or else natural or synthetic fibrous mineral-like materials, e.g. wollastonite, metal fibers, and in particular glass fibers, of varying length, which may optionally have been treated with a size. Examples of organic fillers that can be used are: carbon black, melamine, colophony, cyclopentadienyl resins, and graft polymers, and also cellulose fibers, polyamide fibers, polyacrylonitrile fibers, polyurethane fibers, and polyester fibers, where these are based on aromatic and/or aliphatic dicarboxylic esters, and in particular carbon fibers.

The inorganic and organic fillers can be used individually or in the form of a mixture, and the amounts of these advantageously added to the reaction mixture are from 0.5 to 50% by weight, preferably from 1 to 40% by weight, based on the weight of components (a) to (c).

It is essential to the invention here that particular conditions are fulfilled for the respective embodiments of the method of the invention.

In the first embodiment, the relatively high-molecular-weight compound b) used comprises a mixture comprising a polyester polyol and a hydrophobic, hyperbranched polyester. It is preferable that the relatively high-molecular-weight compound b) used comprises a mixture composed of polyester polyol and of a hydrophobic, hyperbranched polyester, and the polyesterol used here can comprise any of the polyesterols described above. A hyperbranched polyester of the invention is obtainable via reaction of at least one dicarboxylic acid ($A_2$) or of derivatives of the same with s1) at least one at least trifunctional alcohol ($B_3$), or t1) at least one difunctional alcohol ($B_2$) and at least one x-functional alcohol ($C_x$) which has more than two OH groups, where x is a number greater than 2, and where the average functionality of the entire mixture of the alcohols used is from 2.1 to 10, or via reaction of at least one polycarboxylic acid ($D_y$) or derivative thereof which has more than two acid groups, where y is a number greater than 2, with s2) at least one at least difunctional alcohol ($B_2$), or t2) at least one difunctional alcohol ($B_2$) and at least one x-functional alcohol ($C_x$) which has more than two OH groups, where x is a number greater than 2, where u) the reaction can also include up to 50 mol %, preferably up to 40 mol %, particularly preferably up to 30 mol %, and with particular preference up to 20 mol %, based on the alcohols $B_3$, $B_2$, and/or $C_x$ reacted as in s1), s2), t1), and t2), of a hydrophobic long-chain monofunctional alcohol $E_1$ having at least 8 carbon atoms, and v) there is optionally subsequent reaction with a long-chain hydrophobic monocarboxylic acid having at least 8 carbon atoms, where one or more of the following conditions is/are fulfilled:

i) the alcohol $B_3$ and, respectively, $B_2$, and/or $C_x$ is a hydrophobic alkoxylate based on propylene oxide, butylene oxide, or styrene oxide having an average of at least 1 and at most 100 oxyalkylene units per starter molecule, and having a difunctional (for $B_2$), trifunctional (for $B_3$), or x-functional (for $C_x$) starter molecule;

ii) the alcohols $B_3$ and, respectively, $B_2$ and/or $C_x$ comprise at least 20 mol %, preferably at least 30 mol %, particularly preferably at least 40 mol %, and very particularly preferably at least 50 mol %, of a long-chain diol or, respectively, polyol having at least 8 carbon atoms;

iv) the reaction also includes at least 10 mol % and at most 90 mol %, preferably at most 70 mol %, particularly preferably at most 50 mol %, and with particular preference at most 30 mol %, based on the alcohols $B_3$, $B_2$, and/or $C_x$ reacted as in s1), s2), t1), and t2), of a long-chain monoalcohol having at least 8 carbon atoms;

v) subsequent reaction takes place with from 10 to 100 mol %, preferably from 10 to 80 mol %, particularly preferably from 20 to 80 mol %, with particular preference from 20 to 60 mol %, based on the average number of the OH groups of the hyperbranched polyester, of a long-chain hydrophobic monocarboxylic acid having at least 8 carbon atoms.

For the purposes of the present invention, "hyperbranched" means that the degree of branching (DB) is from 10 to 100%, preferably from 10 to 99.9%, particularly preferably from 20 to 99%, in particular from 20 to 95%. The term also comprises dendrimers having 100% degree of branching. For the definition of "degree of branching", see H. Frey et al., Acta Polym. 1997, 48, 30.

A type $A_xB_y$ polyester is a condensate of the molecules A and B where the molecules A have functional groups funkt1) and the molecules B have functional groups funkt2), and these are capable of condensation reactions with one another. The functionality of the molecules A here is equal to x, and the functionality of the molecules B here is equal to y. By way of example, mention may be made of a polyester made of adipic acid as molecule A (funkt1=COOH, x=2) and glycerol as molecule B (funkt2=OH; y=3).

It is possible, of course, that the units A and, respectively, B used also comprise mixtures of various molecules A having the same functional group and having the same and/or different functionalities, and of various molecules B having the same functional group and having the same and/or different functionalities. The functionalities x and y of the mixture are then obtained by averaging.

The ratio of the reactive groups in the reaction mixture is generally selected in such a way that the resultant molar ratio of OH groups to carboxy groups or derivatives of these is from 5:1 to 1:5, preferably from 4:1 to 1:4, particularly preferably from 3:1 to 1:3, particularly preferably from 2.8:1 to 1:2.8, and very particularly preferably from 2.5:1 to 1:2.5.

In another particularly preferred embodiment, within the reaction mixture, one of the two components, the carboxylic acid component used for synthesizing the hyperbranched polymer, or the alcohol component, is used in molar excess. The result is formation of particularly preferred, predominantly COOH-terminated or predominantly OH-terminated, hyperbranched polyesters. Molar excess ratios of the COOH groups with respect to the OH groups, or excesses of the OH groups with respect to the COOH groups, which have proven advantageous are from 1.1:1 to 3:1, preferably from 1.3:1 to 2.8:1, preferably from 1.5:1 to 2.6:1, particularly preferably from 1.7:1 to 2.4:1, very preferably from 1.8:1 to 2.4:1, and with particular preference from 1.9:1 to 2.4:1.

Operations are optionally carried out in the presence of a solvent and optionally in the presence of an inorganic, organometallic, or low-molecular-weight organic catalyst or of an enzyme. The most inexpensive production method, which is therefore preferred, uses the reaction in bulk, i.e. without solvent. Catalysts used comprise the usual catalysts known to the person skilled in the art for the esterification reaction, for example those described by way of example in WO 2008/071622.

For the purposes of the present invention, hyperbranched polyesters have molecular and structural nonuniformity. They differ from dendrimers in having molecular nonuniformity and are therefore considerably less expensive to produce.

Examples of suitable hydrophobic long-chain dicarboxylic acids having 8 or more carbon atoms are suberic acid (octanedioic acid), azelaic acid, sebacic acid (decanedioic acid), dodecanedioic acid, and tetradecanedioic acid. Among the long-chain dicarboxylic acids are in particular those having long-chain alkyl or alkenyl substituents, an example being alkenylsuccinic acid having a C8-C24-alkenyl radical, preferably C12-C18-alkenyl radical.

Among the long-chain dicarboxylic acids are in particular α,β-unsaturated carboxylic acids or derivatives thereof hydrophobicized via reactions which add hydrophobic radicals onto the carbon-carbon double bond. The α,β-unsaturated carboxylic acids and derivatives thereof used here preferably comprise maleic acid, maleic anhydride, and fumaric acid, particularly preferably maleic anhydride. The hydrophobicizing process can take place after, or preferably prior to, the reaction with the alcohol to give the polyester. Hydrophobizing agents that can be used comprise hydrophobic compounds comprising at least one carbon-carbon double bond, e.g. linear or branched olefins, linear or branched polyisobutylene, polybutadiene, or polyisoprene having an average respectively of from 8 to 160 carbon atoms.

Among the long-chain dicarboxylic acids are also unsaturated fatty acids and derivatives thereof, and also dimerized fatty acids (e.g. oleic acid dimerized by way of the olefinic unit).

Examples of suitable cycloaliphatic dicarboxylic acids are cis- and trans-cyclohexane-1,2-dicarboxylic acid, cis- and trans-cyclohexane-1,3-dicarboxylic acid, and cis- and transcyclohexane-1,4-dicarboxylic acid, where the abovementioned dicarboxylic acids can have substitution.

Examples of suitable aromatic dicarboxylic acids are phthalic acid, isophthalic acid, and terephthalic acid.

It is also possible to use any mixture of two or more of the abovementioned compounds.

The dicarboxylic acids can be used either as they stand or in the form of their derivatives.

Derivatives are preferably
- the relevant anhydrides in monomeric or else polymeric form,
- mono- or dialkyl esters, preferably mono- or dimethyl esters, or the corresponding mono- or diethyl esters, or else the mono- and dialkyl esters derived from higher alcohols, e.g. n-propanol, isopropanol, n-butanol, isobutanol, tert-butanol, n-pentanol, n-hexanol, and also
- mono- and divinyl esters, and also
- mixed esters, preferably methyl ethyl esters.

It is also possible to use a mixture of a dicarboxylic acid with one or more derivatives thereof. It is equally possible to use a mixture of a plurality of different derivatives of one or more dicarboxylic acids.

Examples of tricarboxylic acids or polycarboxylic acids ($D_y$) that can be reacted are aconitic acid, 1,3,5-cyclohexanetricarboxylic acid, 1,2,4-benzenetricarboxylic acid, 1,3,5-benzenetricarboxylic acid, 1,2,4,5-benzenetetracarboxylic acid (pyromellitic acid), and also mellitic acid and low-molecular-weight polyacrylic acids.

Tricarboxylic acids or polycarboxylic acids ($D_y$) can be used either as they stand or else in the form of derivatives.

It is also possible to use a mixture of a tri- or polycarboxylic acid with one or more derivatives thereof, for example a mixture of pyromellitic acid and pyromellitic dianhydride. It is equally possible to use a mixture of a plurality of different derivatives of one or more tri- or polycarboxylic acids, for example a mixture of 1,3,5-cyclohexanetricarboxylic acid and pyromellitic dianhydride.

Tricarboxylic acids or polycarboxylic acids can be used in the reaction of the invention either as they stand or else in the form of derivatives.

It is also possible to use a mixture of a tri- or polycarboxylic acid with one or more derivatives thereof. It is equally possible for the purposes of the present invention to use a mixture of a plurality of different derivatives of one or more tri- or polycarboxylic acids to obtain the hyperbranched polyester.

Examples of diols ($B_2$) used are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3-, and 1,4-cyclohexanediols, 1,1-, 1,2-, 1,3-, and 1,4-bis(hydroxymethyl)cyclohexanes, 1,1-, 1,2-, 1,3-, and 1,4-bis(hydroxyethyl)cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H, or polypropylene glycols $HO(CH[CH_3]CH_2O)_n$—H, where n is a whole number and n≥4, polyethylene polypropylene glycols, where the sequence of the ethylene oxide units or of the propylene oxide units can be of block or random type, polytetramethylene glycols, preferably up to a molar mass of 5000 g/mol, poly-1,3-propanediols, preferably having a molar mass of up to 5000 g/mol, polycaprolactones, or a mixture of two or more representatives of the above compounds. One or else both of the hydroxy groups in the abovementioned diols can be replaced by SH groups. Diols whose use is preferred are ethylene glycol, 1,2-propanediol, 1,3-propanediol, 1,4-butanediol, 1,5-pentanediol, 1,6-hexanediol, 1,8-octanediol, 1,2-, 1,3-, and 1,4-cyclohexanediol, 1,3- and 1,4-bis(hydroxymethyl)cyclohexane, and also diethylene glycol, triethylene glycol, dipropylene glycol, tripropylene glycol, polyethylene glycols $HO(CH_2CH_2O)_n$—H, or polypropylene glycols $HO(CH[CH_3]CH_2O)_n$—H, where n is a whole number and n≥4, polyethylene polypropylene glycols, where the sequence of the ethylene oxide units and of the propylene oxide units can be of block or random type, or polytetramethylene glycols, preferably up to a molar mass of 5000 g/mol.

The difunctional alcohols $B_2$ can optionally also comprise further functionalities, e.g. carbonyl, carboxy, alkoxycarbonyl, or sulfonyl functions, examples being dimethylolpropionic acid or dimethylolbutyric acid, and also $C_1$-$C_4$-alkyl esters thereof, glycerol monostearate, or glycerol monooleate.

Examples of suitable long-chain diols $B_2$ having at least 8 carbon atoms are 1,8-octanediol, 1,2-octanediol, 1,9-nonanediol, 1,2-decanediol, 1,10-decanediol, 1,2-dodecanediol, 1,12-dodecanediol, and also monofatty acid esters of triols, in particular monofatty acid esters of glycerol, e.g. glycerol monostearate, glycerol monooleate, and glycerol monopalmitate.

At least trifunctional alcohols ($B_3$ and, respectively, $C_x$) comprise glycerol, trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, diglycerol, triglycerol, and higher condensates of glycerol, di(trimethylolpropane), di(pentaerythritol), trishydroxymethyl isocyanurate, tris(hydroxyethyl) isocyanurate (THEIC), tris(hydroxypropyl) isocyanurate, inositols, sugars, e.g. glucose, fructose, or sucrose, sugar alcohols, e.g. sorbitol, mannitol, threitol, erythritol, adonitol (ribitol), arabitol (lyxitol), xylitol, dulcitol (galactitol), maltitol, isomalt, and trifunctional or higher-functionality polyetherols based on trifunctional or higher-functionality alcohols and propylene oxide and/or butylene oxide.

Particular preference is given here to glycerol, diglycerol, triglycerol, trimethylolethane, trimethylolpropane, bis(trimethylolpropane), 1,2,4-butanetriol, pentaerythritol, di(pentaerythritol), tris(hydroxyethyl) isocyanurate, and also polyetherols of these based on propylene oxide.

The at least trifunctional alcohols $B_3$ can optionally also comprise further functionalities, e.g. carbonyl functions, carboxy functions, alkoxycarbonyl functions, or sulfonyl functions, examples being gallic acid and its derivatives.

Examples of suitable hydrophobic long-chain aliphatic monocarboxylic acids F are octanoic acid, decanoic acid, dodecanoic acid, tetradecanoic acid, and fatty acids, such as stearic acid, oleic acid, lauric acid, palmitic acid, linoleic acid, and linolenic acid.

In one embodiment i) of the invention, the alcohol $B_3$ and, respectively, $B_2$, and/or $C_x$ is a hydrophobic alkoxylate based on propylene oxide or butylene oxide, having an average of at least 1 and at most 100 oxyalkylene units per starter molecule, preferably at most 50 oxyalkylene units per starter molecule. Preferred alcohols $B_3$ and, respectively, $B_2$, and/or $C_x$ are the propoxylates of monoethylene glycol, diethylene glycol, propylene glycol, dipropylene glycol, tripropylene glycol, glycerol, trimethylolpropane, pentaerythritol, sorbitol, or sucrose, where these have an average of from 1 to 30 oxypropylene units per OH group, in particular from 1 to 20 oxypropylene units per OH group.

In another embodiment ii) of the invention, the alcohols $B_3$ and, respectively, $B_2$, and/or $C_x$ comprise at least 20 mol %, preferably at least 30 mol %, in particular 40 mol %, and very particularly at least 50 mol %, of a long-chain diol or polyol having at least 8 carbon atoms, preferably having at least 10 carbon atoms, particularly preferably having at least 12 carbon atoms. Particularly preferred diols or polyols having at least 8 carbon atoms are isomers of octanediol, of nonanediol, of decanediol, of dodecanediol, of tetradecanediol, of hexadecanediol, of octadecanediol, of dimethylolcyclohexane, and of dimethylolbenzene.

In another embodiment iii) of the invention, the dicarboxylic acid is a hydrophobic long-chain aliphatic dicarboxylic acid, or an aromatic or cycloaliphatic dicarboxylic acid having at least 8 carbon atoms. It is preferable to react aliphatic long-chain dicarboxylic acids. These preferably have at least 10, in particular at least 12, carbon atoms. They generally have at most 100 carbon atoms, preferably at most 50 carbon atoms. Alongside these, it is possible to make concomitant use of amounts of up to 90 mol %, preferably amounts of up to 70 mol %, particularly preferably amounts of up to 50 mol %, based on the total amount of the dicarboxylic acids, of relatively short-chain dicarboxylic acids.

Preferred long-chain aliphatic dicarboxylic acids are suberic acid (octanedioic acid), azelaic acid, sebacic acid (decanedioic acid), dodecanedioic acid, and tetradecanedioic acid; alkenylsuccinic acid, in particular having a C8-C24-alkenyl radical, preferably those having a C12-C18-alkenyl radical, and with particular preference having a C16-C18-alkenyl radical, where further preference is given to the even-numbered alkenyl radicals rather than to uneven-numbered alkenyl radicals; adducts of linear or branched polyisobutylene, polybutadiene, polyisoprene having an average of from 8 to 160 carbon atoms onto α,β-unsaturated carboxylic acids, in particular maleic acid or fumaric acid; fatty acids or derivatives of these, and dimerized fatty acids.

The polycarboxylic acid $D_y$ having more than two acid groups preferably comprises hydrophobic long-chain, and also cyclic, aliphatic, and aromatic polycarboxylic acids. Particular preference is given to aconitic acid, and also to isomers of cyclohexanetricarboxylic acid, of benzenetricarboxylic acid, and to oligomeric polyacrylic acids having at least 3 and at most 10 acid groups.

In another embodiment iv) of the invention, the reaction includes at least 10 mol % and at most 90 mol %, preferably at most 70 mol %, particularly preferably at most 50 mol %, and with particular preference at most 30 mol %, based on the alcohols $B_3$, $B_2$, and/or $C_x$ reacted as in s1), s2), t1), and t2), of a long-chain monoalcohol having at least 8 carbon atoms, preferably at least 10 carbon atoms. Preferred long-chain monoalcohols are octanol, decanol, dodecanol, tetradecanol, C16 alcohols, and C18 alcohols.

In another embodiment v) of the invention, the reaction product obtained from components s1) and t1) and, respectively, s2) and t2) is then reacted with from 10 to 100 mol %, preferably from 20 to 100 mol %, particularly preferably from 20 to 80 mol %, with particular preference from 20 to 60 mol %, based on the average number of the OH groups of the hyperbranched polyester, of a long-chain hydrophobic monocarboxylic acid having at least 8 carbon atoms, preferably at least 10 carbon atoms, in particular having at least 12 carbon atoms. Preferred long-chain monocarboxylic acids are octanoic acid, decanoic acid, dodecanoic acid, tetradecanoic acid, and fatty acids, such as stearic acid and oleic acid.

Particularly preferred hydrophobic hyperbranched polyesters are obtained when i) the alcohol $B_3$ and, respectively, $B_2$, and/or $C_x$ is a hydrophobic alkoxylate based on propylene oxide or butylene oxide, having an average of from 1 to 15 oxyalkylene units per OH group, and iii) this is reacted with a hydrophobic long-chain aliphatic dicarboxylic acid, with an aromatic or cycloaliphatic dicarboxylic acid having at least 8 carbon atoms, in particular with a long-chain aliphatic dicarboxylic acid having at least 8 carbon atoms, or with a hydrophobic long-chain aliphatic polycarboxylic acid, or with an aromatic or cycloaliphatic polycarboxylic acid $D_y$ having more than two acid groups and at least 9 carbon atoms, or i) the alcohol $B_3$ and, respectively, $B_2$, and/or $C_x$ is a hydrophobic alkoxylate based on propylene oxide or butylene oxide, having an average of from 1 to 15 oxyalkylene units per OH group, and iii) this is reacted with a hydrophobic long-chain aliphatic dicarboxylic acid, with an aromatic or cycloaliphatic dicarboxylic acid having at least 8 carbon atoms, in particular with a long-chain aliphatic dicarboxylic acid having at least 8 carbon atoms, or with a hydrophobic long-chain aliphatic polycarboxylic acid, or with an aromatic or cycloaliphatic polycarboxylic acid $D_y$ having more than two acid groups and at least 9 carbon atoms, where one of the two components, the carboxylic acid component or the alcohol component, within the reaction mixture for synthesizing the hyperbranched polyester, is used in molar excess, and the molar excess ratio of the COOH groups with respect to the OH groups or the excess of the OH groups with respect to the COOH groups is from 1.1:1 to 3:1, preferably from 1.3:1 to 2.8:1, preferably from 1.5:1 to 2.6:1, particularly preferably from 1.7:1 to 2.4:1, very preferably from 1.8:1 to 2.4:1, and with particular preference from 1.9:1 to 2.4:1, and in particular the carboxylic acid component is used in molar excess and the molar excess ratio of the COOH groups with respect to the OH groups is from 1.1:1 to 3:1, preferably from 1.3:1 to 2.8:1, preferably from 1.5:1 to 2.6:1, particularly preferably from 1.7:1 to 2.4:1, very preferably from 1.8:1 to 2.4:1, and with particular preference from 1.9:1 to 2.4:1, or i) the alcohol $B_3$ and, respectively, $B_2$, and/or $C_x$ is a hydrophobic alkoxylate based on propylene oxide or butylene oxide, having an average of from 1 to 15 oxyalkylene units per OH group, and iv) the reaction includes at least 10 mol % and at most 90 mol %, preferably at most 70 mol %, particularly preferably at most 50 mol %, and with particular preference at most 30 mol %, based on the alcohols $B_3$, $B_2$, and/or $C_x$ reacted as in s1), s2), t1), and t2), of a long-chain monoalcohol having at least 8 carbon atoms, or i) the alcohol $B_3$ and, respectively, $B_2$, and/or $C_x$ is a hydrophobic alkoxylate based on propylene oxide or butylene oxide, having an average of from 1 to 15 oxyalkylene units per OH group, and v) the reaction product from s1) and t1) and, respectively, s2) and t2) is subsequently reacted with from 10 to 100 mol %, preferably from 20 to 100 mol %, particularly preferably from 20 to 80 mol %, with particular preference from 20 to 60 mol %, based on the average number of the OH groups of the hyperbranched polyester, of a long-chain hydrophobic monocarboxylic acid having at least 8 carbon atoms.

The number-average molar mass $M_n$ of the hydrophobic hyperbranched polyester used in the invention is generally from 700 to 15 000 g/mol, preferably from 1000 to 12 000 g/mol, and in particular from 1500 to 10 000 g/mol, measured by GPC, calibrated with a polymethyl methacrylate (PMMA) standard.

The OH number to DIN 53240 of the hydrophobic hyperbranched polyester used in the invention is generally from 0 to 500 mg KOH/g of polyester, preferably from 0 to 400 mg KOH/g of polyester, in particular from 0 to 300 mg KOH/g of polyester.

The acid number to DIN 53240, part 2 of the hydrophobic hyperbranched polyesters used in the invention is generally from 0 to 300 mg KOH/g, preferably from 0 to 200 mg KOH/g, preferably from 1 to 150 mg KOH/g, particularly preferably from 1 to 125 mg KOH/g, preferably from 5 to 125 mg KOH/g, and in particular from 10 to 125 mg KOH/g.

The glass transition temperature (measured by ASTM method D3418-03, using DSC) of the hydrophobic hyperbranched polyesters used in the invention is generally from −60 to 100° C., preferably from −40 to 80° C.

The production of the hydrophobic hyperbranched polyesters is described by way of example in WO 2009112576.

The amount generally used of the hydrophobic hyperbranched polyester is from 0.2 to 40% by weight, preferably from 1 to 30% by weight, particularly preferably from 2 to 20% by weight, and in particular from 2.5 to 7.5% by weight, based on the entirety of relatively high-molecular-weight compound b) and of hydrophobic hyperbranched polyester. An amount of as little as 3% by weight of hydrophobic hyperbranched polyester is generally sufficient to bring about the desired open-cell and coarse-cell nature of the material and thus to provide the very good tear propagation resistance of the polyurethane foams.

In a second embodiment, the relatively high-molecular-weight compound b) used comprises a mixture comprising polyester polyol and a hydrophobic, hyperbranched polycarbonate. The relatively high-molecular-weight compound b) used preferably comprises a mixture composed of polyester polyol and of a hydrophobic, hyperbranched polyester. The polyesterol used here can comprise any of the polyesterols described under b). A hyperbranched polycarbonate of the invention is obtainable via reaction of at least one carbonic ester ($A_2$) or of derivatives of the same with l) at least one at least trifunctional alcohol ($B_3$), or m) at least one difunctional alcohol ($B_2$) and at least one x-functional alcohol ($C_x$) which has more than two OH groups, where x is a number greater than 2, and where the average functionality of the entire mixture of the alcohols used is from 2.1 to 10, where n) the reaction can also include up to 50 mol %, preferably up to 40 mol %, particularly preferably up to 30 mol %, and with particular preference up to 20 mol %, based on the alcohols $B_3$, $B_2$, and/or $C_x$ reacted as in a) and b), of a hydrophobic long-chain monofunctional alcohol $E_1$ having at least 8 carbon atoms, and o) there is optionally subsequent reaction with a long-chain hydrophobic OH-reactive compound F, e.g. a monocarboxylic acid or a monoisocyanate having at least 8 carbon atoms, p) there is optionally subsequent reaction with propylene oxide and/or butylene oxide, where one or more of the following conditions is/are fulfilled:

I) the alcohol $B_3$ and, respectively, $B_2$, and/or $C_x$ is a hydrophobic alkoxylate based on propylene oxide, butylene oxide, or styrene oxide having an average of at least 1 and at most 100 oxyalkylene units per starter molecule, and having a difunctional (for $B_2$), trifunctional (for $B_3$), or x-functional (for $C_x$) starter molecule;

II) the alcohols $B_3$ and, respectively, $B_2$ and/or $C_x$ comprise at least 20 mol %, preferably at least 30 mol %, particularly preferably at least 40 mol %, and very particularly preferably at least 50 mol %, of a long-chain diol or, respectively, polyol having at least 8 carbon atoms;

III) the reaction includes at least 10 mol % and at most 90 mol %, preferably at most 70 mol %, particularly preferably at most 50 mol %, and with particular preference at most 30 mol %, based on the alcohols $B_3$, $B_2$, and/or $C_x$ reacted as in l) and m), of a long-chain monoalcohol having at least 8 carbon atoms;

IV) subsequent reaction takes place with from 10 to 100 mol %, preferably from 10 to 80 mol %, particularly preferably from 20 to 80 mol %, with particular preference from 20 to 60 mol %, based on the average number of the OH groups of the hyperbranched polycarbonate, of the long-chain hydrophobic OH-reactive compound F having at least 8 carbon atoms;

V) there is subsequent reaction with, per equivalent of OH groups of the hyperbranched polycarbonate, from 1 to 60 equivalents, preferably from 2 to 50 equivalents, particularly preferably from 3 to 40 equivalents, and with particular preference from 3 to 30 equivalents, of propylene oxide or butylene oxide, or propylene oxide and butylene oxide.

A type $A_xB_y$ polyester is a condensate of the molecules A and B where the molecules A have functional groups funkt1) and the molecules B have functional groups funkt2), and these are capable of condensation reactions with one another. The functionality of the molecules A here is equal to x, and the functionality of the molecules B here is equal to y. By way of example, mention may be made of a polycarbonate made of diethyl carbonate as molecule A (funkt1=COOEt, x=2) and propoxylated glycerol as molecule B (funkt2=OH; y=3). Hyperbranched polycarbonates are described by way of example in WO 2005/026234.

It is possible, of course, that the units A and, respectively, B used also comprise mixtures of various molecules A having the same functional group and having the same and/or different functionalities, and of various molecules B having the same functional group and having the same and/or different functionalities. The functionalities x and y of the mixture are then obtained by averaging.

Suitable hyperbranched polycarbonates can by way of example be produced via

1.) reaction of at least one organic carbonate of the general formula $R^aOC(=O)OR^b$ with at least one aliphatic alcohol ($B_3$ or $C_x$) which has at least 3 OH groups, with elimination of alcohols $R^aOH$ or $R^bOH$ to give one or more condensates (K), where each of $R^a$ and $R^b$, independently of the other, has been selected from straight-chain or branched alkyl, arylalkyl, cycloalkyl, and aryl radicals, and $R^a$ and $R^b$ here can also, together with the —OC(=O)O— group to which they are bonded, be a cyclic carbonate, 2.) reaction of phosgene, diphosgene, or triphosgene with the alcohol ($B_3$ or $C_x$) mentioned under 1.), to give the condensate K, with elimination of hydrogen chloride, and also 3.) intermolecular reaction of the condensates (K) to give a high-functionality, hyperbranched polycarbonate, where the quantitative proportion of the OH groups with respect to the carbonates in the reaction mixture is selected in such a way that the condensates (K) have an average of either one carbonate group and more than one OH group or one OH group and more than one carbonate group.

The radicals $R^a$ and $R^b$ can be identical or different. In one specific embodiment, $R^a$ and $R^b$ are identical. It is preferable that $R^a$ and $R^b$ have been selected from $C_1$-$C_{20}$-alkyl, $C_5$-$C_7$-cycloalkyl, $C_6$-$C_{10}$-aryl, and $C_6$-$C_{10}$-aryl-$C_1$-$C_{20}$-alkyl, as defined in the introduction. $R^a$ and $R^b$ can also together be $C_2$-$C_6$-alkylene. It is particularly preferable that $R^a$ and $R^b$ have been selected from straight-chain and branched $C_1$-C5-alkyl, as defined in the WO 2005/026234.

By way of example, dialkyl or diaryl carbonates may be produced from the reaction of aliphatic, araliphatic, or aromatic alcohols, preferably monoalcohols, with phosgene. They may also be produced by way of oxidative carbonylation of the alcohols or phenols by means of CO in the presence of noble metals, oxygen, or $NO_x$. In relation to production methods for diaryl or dialkyl carbonates, see also "Ullmann's Encyclopedia of Industrial Chemistry", 6th edition, 2000 Electronic Release, Verlag Wiley-VCH.

Examples of suitable carbonates comprise aliphatic or aromatic carbonates, such as ethylene carbonate, propylene 1,2- or 1,3-carbonate, diphenyl carbonate, ditolyl carbonate, dixylyl carbonate, dinaphthyl carbonate, ethyl phenyl carbonate, dibenzyl carbonate, dimethyl carbonate, diethyl carbonate, dipropyl carbonate, dibutyl carbonate, diisobutyl carbonate, dipentyl carbonate, dihexyl carbonate, dicyclohexyl carbonate, diheptyl carbonate, dioctyl carbonate, didecyl carbonate, or didodecyl carbonate.

It is preferable to use aliphatic carbonates, in particular those in which the radicals comprise from 1 to 5 carbon atoms, e.g. dimethyl carbonate, diethyl carbonate, dipropyl carbonate, dibutyl carbonate, or diisobutyl carbonate.

The organic carbonates are reacted with at least one aliphatic alcohol ($B_3$ or $C_x$), which has at least 3 OH groups, or with a mixture of two or more of these alcohols.

A definition of at least trifunctional alcohols ($B_3$ and, respectively, $C_x$) has been given above under the fourth embodiment, and they can be used as defined above.

Said polyfunctional alcohols can also be used in a mixture with difunctional alcohols ($B_2$), with the proviso that the average OH functionality of all of the alcohols used together is greater than 2. A definition has likewise been given above for the difunctional alcohols ($B_2$), and these can be used as defined above.

The reaction of the carbonate with the alcohol or alcohol mixture to give the hyperbranched polycarbonate of 1.) takes place with elimination of the monofunctional alcohol or phenol from the carbonate molecule.

The reaction of the phosgene or phosgene derivative with the alcohol or alcohol mixture to give the hyperbranched polycarbonate as in 2.) takes place with elimination of hydrogen chloride.

The hyperbranched polycarbonates formed have termination by hydroxy groups and/or by carbonate groups after the reaction, i.e. with no further modification.

A hyperbranched polycarbonate is a product which also has, alongside the carbonate groups which form the main structure of the polymer, at least four, preferably at least eight, terminal or pendent functional groups. The functional groups are carbonate groups and/or OH groups. There is in principle no upper restriction on the number of the terminal or pendent functional groups, but products having a very large number of functional groups can have undesired properties, for example high viscosity or poor solubility. Most of the high-functionality polycarbonates of the present invention have no more than 500 terminal or pendent functional groups, preferably no more than 200, in particular no more than 100.

For the purposes of the present invention, hyperbranched polycarbonates have molecular and structural nonuniformity. They differ from dendrimers in having molecular nonuniformity and are therefore considerably less expensive to produce.

Production of the hydrophobic hyperbranched polycarbonates is described by way of example in WO 2009112576.

The polycarbonates can also obtain further functional groups alongside the functional groups intrinsically obtained via the reaction. This functionalization can take place during the process of molecular-weight increase or else subsequently, i.e. after the actual polycondensation reaction has ended.

Subsequent functionalization can be obtained by reacting the resultant high-functionality, hyperbranched polycarbonate with a suitable functionalizing reagent which can react with the OH and/or carbonate groups of the polycarbonate.

High-functionality, hyperbranched polycarbonates comprising hydroxy groups can by way of example be modified by adding molecules F comprising acid groups or comprising isocyanate groups. By way of example, polycarbonates can be hydrophobically modified via reaction with monocarboxylic acids or with monoisocyanates.

Examples of suitable hydrophobic long-chain aliphatic carboxylic acids are octanoic acid, decanoic acid, dodecanoic acid, tetradecanoic acid, and fatty acids, such as stearic acid, oleic acid, lauric acid, palmitic acid, linoleic acid, and linolenic acid.

High-functionality polycarbonates comprising hydroxy groups can also be converted to hydrophobic hyperbranched polycarbonate polyether polyols via reaction with propylene oxide and/or butylene oxide.

In one embodiment I) of the invention, the alcohol $B_3$ and, respectively, $B_2$, and/or $C_x$ is a hydrophobic alkoxylate based on propylene oxide or butylene oxide, having an average of at least 1 and at most 100 oxyalkylene units per starter molecule, preferably at most 50 oxyalkylene units per starter molecule. Preferred alcohols $B_3$ and, respectively, $B_2$, and/or $C_x$ are the propoxylates of monoethylene glycol, diethylene glycol, propylene glycol, dipropylene glycol, tripropylene glycol, glycerol, trimethylolpropane, pentaerythritol, sorbitol, or sucrose, where these have an average of from 1 to 30 oxypropylene units per OH group, in particular from 1 to 20 oxypropylene units per OH group.

In another embodiment II) of the invention, the alcohols $B_3$ and, respectively, $B_2$, and/or $C_x$ comprise at least 20 mol %, preferably at least 30 mol %, particularly 40 mol %, and very particularly at least 50 mol %, of a long-chain diol or, respectively, polyol having at least 8 carbon atoms, preferably having at least 10 carbon atoms, particularly preferably having at least 12 carbon atoms. Particularly preferred diols or polyols having at least 8 carbon atoms are isomers of octanediol, of nonanediol, of decanediol, of dodecanediol, of tetradecanediol, of hexadecanediol, of octadecanediol, of dimethylolcyclohexane, and of dimethylolbenzene.

In another embodiment III) of the invention, the reaction includes at least 10 mol % and at most 90 mol %, preferably at most 70 mol %, particularly preferably at most 50 mol %, and with particular preference at most 30 mol %, based on the alcohols $B_3$, $B_2$, and/or $C_x$ reacted as in a) and b), of a long-chain monoalcohol $E_1$ having at least 8 carbon atoms, preferably having at least 10 carbon atoms. Preferred long-chain monoalcohols are octanol, decanol, dodecanol, tetradecanol, C16 alcohols and C18 alcohols.

In another embodiment IV) of the invention, the reaction product obtained from components a) and b) is subsequently reacted with 10 to 100 mol %, preferably from 20 to 100 mol %, particularly preferably from 20 to 80 mol %, with particular preference from 20 to 60 mol %, based on the average number of the OH groups of the hyperbranched polycarbonate, of a long-chain hydrophobic OH-reactive compound F, such as a monocarboxylic acid or a monoisocyanate, having at least 8 carbon atoms, preferably at least 10 carbon atoms, in particular having at least 12 carbon atoms. Preferred long-chain monocarboxylic acids F are octanoic acid, decanoic acid, dodecanoic acid, tetradecanoic acid, and fatty acids, such as stearic acid and oleic acid. Preferred long-chain monoisocyanates F are octane isocyanate, decane isocyanate, dodecane isocyanate, tetradecane isocyanate, and monoisocyanates of fatty acids, e.g. stearyl isocyanate and oleyl isocyanate.

Particularly preferred hydrophobic hyperbranched polycarbonates are obtained when I) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group;
or
I) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group, and
within the reaction mixture, one of the two components, the carbonic ester component or the alcohol component, for synthesizing the hyperbranched polycarbonate, is used in molar excess, and the molar ratio of the (CO)OR groups with respect to the OH groups and, respectively, the excess of the OH groups with respect to the (CO)OR groups is from 1.1:1 to 3:1, preferably from 1.3:1 to 2.8:1, preferably from 1.5:1 to 2.6:1, particularly preferably from 1.7:1 to 2.4:1, very preferably from 1.8:1 to 2.2:1, and with particular preference from 1.9:1 to 2.1:1,
or
I) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group, and
III) the reaction includes at least 10 mol % and at most 90 mol %, preferably at most 70 mol %, particularly preferably at most 50 mol %, and with particular preference at most 30 mol %, based on the alcohols $B_3$, $B_2$, and/or $C_x$ reacted as in a) and b), of a long-chain monoalcohol $E_1$ having at least 8 carbon atoms,
or
I) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group, and
IV) the reaction product from a) and b) is subsequently reacted with from 10 to 100 mol %, preferably from 20 to 100 mol %, particularly preferably from 20 to 80 mol %, with particular preference from 20 to 60 mol %, based on the average number of the OH groups of the hyperbranched polycarbonate, of a long-chain hydrophobic OH-reactive compound $F_1$, such as a monocarboxylic acid or a monoisocyanate having at least 8 carbon atoms.

The number-average molar mass $M_n$ of the hydrophobic hyperbranched polycarbonate used in the invention is generally from 800 to 40 000 g/mol, preferably from 1000 to 30 000 g/mol, and in particular from 1500 to 20 000 g/mol, measured by GPC, calibrated with a polymethyl methacrylate (PMMA) standard.

A particularly advantageous weight-average molar mass $M_w$, measured by GPC, calibrated using a polymethyl methacrylate (PMMA) standard, has been found to be from 2000 to 50 000 g/mol, preferably from 3000 to 40 000 g/mol, particularly preferably from 4000 to 35 000 g/mol, and with particular preference from 5000 to 30 000 g/mol.

The OH number to DIN 53240 of the hydrophobic hyperbranched polycarbonate used in the invention is generally from 0 to 600 mg KOH/g of polycarbonate, preferably from 0 to 500 mg KOH/g of polycarbonate, in particular from 0 to 400 mg KOH/g of polycarbonate.

The glass transition temperature (measured by ASTM method D3418-03 using DSC) of the hydrophobic hyperbranched polycarbonates used in the invention is moreover generally from −80 to 100° C., preferably from −60 to 60° C.

Once the reaction to produce the hyperbranched polycarbonates has ended, the hyperbranched polycarbonates can easily be isolated, for example by filtration to remove the catalyst and a concentration process, where the concentration process is usually carried out at reduced pressure. Other work-up methods with good suitability are precipitation after addition of water or of another solvent in which the hyperbranched polycarbonate is insoluble, and subsequent washing and drying.

If the hyperbranched polycarbonate has been produced without addition of solvent and with addition of only small amounts of catalyst, the reaction product immediately after the end of the reaction takes the form of an isolated hyperbranched polycarbonate and can generally be used without any further purification steps.

The amount generally used of the hydrophobic hyperbranched polycarbonate is from 0.2 to 40% by weight, preferably from 1 to 30% by weight, particularly preferably from 2 to 20% by weight, and in particular from 2.5 to 7.5% by weight, based on the entirety of relatively high-molecular-weight compound b) and of hydrophobic hyperbranched polycarbonate. An amount of as little as 3% by weight of hydrophobic hyperbranched polycarbonate is generally sufficient to bring about the desired open-cell and coarse-cell nature of the material and thus to provide the very good tear propagation resistance of the polyurethane foams.

The amounts mixed with one another of components (a) to (f) in the first and second embodiment for producing a polyurethane foam of the invention are respectively such that the equivalence ratio of NCO groups of the polyisocyanates (a) to the entirety of the reactive hydrogen atoms of components (b), (c), and (d) is from 1:0.7 to 1:1.25, preferably from 1:0.85 to 1:1.15.

The polyurethane foams of the invention are preferably produced by the one-shot method, using low-pressure technology or high-pressure technology. The reaction mixture here can be charged to an open or closed mold, optionally temperature-controlled. The molds are usually composed of metal, e.g. aluminum or steel, or of paperboard or wood. These procedures are described by way of example by Piechota and Rohr in "Integralschaumstoff" [Integral foam], Carl-Hanser-Verlag, Munich, Vienna, 1975, or in "Kunststoffhandbuch", Band 7, Polyurethane [Plastics handbook, volume 7, Polyurethanes], 3rd edition, 1993, chapter 7. It is particularly preferable to obtain the polyurethane foams of the invention via an unrestricted foaming process. The reaction mixture can thus by way of example be charged to a continuously running belt and hardened.

The amount of the reaction mixture introduced into the mold is judged in such a way that the density of the resultant foam moldings is from 70 to 300 g/dm³, preferably from 80 to 300 g/dm³, particularly preferably from 90 to 300 g/dm³, and in particular from 100 to 250 g/dm³.

A polyurethane foam of the invention has from 1 to 20 cells per cm, preferably from 1 to 10. This foam exhibits excellent mechanical properties, such as tensile strain at break, tear propagation resistance, elongation at break, and rebound resilience. Adequate rebound performance combined with sufficient compressive strength is required particularly when the polyurethane foam of the invention is used for adsorbing oil on the surface of bodies of water. The result is that the oil absorbed is not released into the body of water when small mechanical stresses arise, for example caused by wave action. Rebound resilience to DIN 53573 is preferably 30% or greater, particularly preferably 35% or greater, and in particular 40% or greater. It is preferable that a polyurethane foam of the invention has, after ageing for 24 hours, tensile strength to DIN EN ISO 1798 greater than 200 kPa, particularly preferably greater than 230 kPa, and in particular greater than 250 kPa, elongation at break to DIN EN ISO 1798 greater than 200%, particularly preferably greater than 250%, tear propagation resistance to ISO 34-1 greater than 1.2 N/mm, particularly preferably greater than 1.6 N/mm, and in particular greater than 2.0 N/mm, and compressive strength, for 40% compression, to DIN EN ISO 3386, greater than 4 kPa, particularly preferably greater than 8 kPa, when its density is 125 g/dm$^3$.

Polyurethane foams of the invention have excellent suitability for adsorbing hydrophobic liquids, because the surface has a certain hydrophobicity and the mechanical properties are excellent. For this, the polyurethane foams of the invention are brought into contact with the hydrophobic liquids. The hydrophobic liquids can then be reclaimed by expulsion from the polyurethane foam, for example with the aid of presses, rolls, or calenders. It is therefore also possible to make repeated use of the polyurethane foam of the invention for absorbing oil.

By way of example, the material can be "brought in contact" by spreading the foam of the invention onto a body of water contaminated with oil, for example crude oil. For this, the foam can take any desired form. By way of example, it is possible to use elongate bodies of width from 10 cm to 10 m, and of thickness from 1 cm to 2 m, and of length from 10 cm to 100 m. By virtue of the coarse-cell nature of the foam of the invention, it is possible to absorb oils and tar residues even when these are highly viscous, for example after oil-related accidents. Because the foam has excellent mechanical properties, it can also be installed in the form of a securely anchored oil barrier. By way of example here, the foam is placed and anchored in front of a harbor exit or in front of a section that requires protection within a body of water, or in front of land adjoining water. Here again, the form of the foam is as desired. By way of example, it is therefore possible to use elongate bodies of foam, as described above, or to use pieces, for example balls, of foam which have been strung together.

Polyurethane sponges of the invention can also be used for the cleaning of oil-contaminated articles and organisms, for example via wiping or padding.

Wave action does not destroy the foam, and does not lead to undesired release of absorbed oil. It is moreover easy to recover the foam comprising oil, since the good mechanical properties of the foam make it difficult to tear, and in particular the high rebound resilience combined with the high compressive strength prevent undesired release of the oil on exposure to small mechanical loads, such as those caused when the foam comprising oil is recovered from the water.

Foams of the invention can also serve as an oil reservoir, for example in a mechanical arrangement. It is therefore possible that a molding molded from a polyurethane foam of the invention, for example a gearwheel, is saturated with oil and runs as part of a mechanical arrangement, for example taking the form of metal gearwheels, whereupon the oil comprised within the polyurethane molding can be released onto the metal gearwheels or onto the other mechanical arrangement.

Examples are used below to illustrate the invention:
Starting Materials
Polyol 1: polyester polyol based on adipic acid, ethylene glycol (0.66 mol %), and 1,4-butanediol (0.33 mol %) having OH number 56 mg KOH/g
Polyol 2: hyperbranched polyester
Polyol 3: hyperbranched polycarbonate
Chain extender 1: monoethylene glycol
Chain extender 2: 1,4-butanediol
Catalyst: triethylenediamine
Inhibitor: diethylene glycol bischloroformate
Foam stabilizer: DC 193® from Dow Corning, silicone-based
Blowing agent: water
Isocyanate: prepolymer composed of 53.8 parts by weight of diphenylmethane 4,4'-diisocyanate (4,4'-MDI), 4.3 parts by weight of carbodiimide-modified 4,4'-MDI, 31.2 parts by weight of polyol 1, and 10.7 parts by weight of a polyester polyol based on adipic acid, ethylene glycol (0.2 mol %), diethylene glycol (0.75 mol %), and glycerol (0.05 mol %), with OH number 60 mg KOH/g.
Carbodiimide-modified 4,4'-MDI: NCO content=29.5% by weight, viscosity=40 mPas (25° C.)
Polyol 2: Hyperbranched Polyester Comprising Hydroxy Groups, Carboxy Groups, Polyether Groups, and Alkyl Radicals as Functional Elements:

1914 g (5.50 mol, M=348 g/mol) of a C-18-alkenylsuccinic acid (Pentasize 8 from Trigon), 649.7 g (1.51 mol, M=430 g/mol) of a polyetherol based on trimethylolpropane randomly grafted with 5 propylene oxide units, and 0.2 g of titanium(IV) butoxide were weighed into a 4 l glass flask equipped with stirrer, internal thermometer, and inclined condenser with vacuum connection, and slowly heated to 195° C., with stirring, where the pressure was slowly reduced to 70 mbar. The reaction mixture was then stirred at 195° C. for 10 h, whereupon the water produced during the reaction was removed by distillation.

The decrease in the acid number was monitored regularly until a value of about 105 mg KOH/g had been reached. The product was then cooled and analyzed.
Analysis:
Acid number: 102 mg KOH/g
GPC: Mn=1000 g/mol, Mw=6700 g/mol (eluent: THF, calibration: PMMA)
Polyol 3: Hyperbranched Polycarbonate Comprising Hydroxy Groups, Carbonate Groups, Polyether Groups, and Alkyl Radicals as Functional Elements:

Diethyl carbonate (144 g, 1.22 mol) was reacted in the presence of dibutyltin dilaurate (1.0 g) at atmospheric pressure under a low-velocity stream of nitrogen at about 140° C. in a 2 l flask equipped with stirrer, internal thermometer, and reflux condenser with a triol (1149 g, 1.11 mol) based on trimethylolpropane randomly grafted with 15 propylene oxide units. During the course of the reaction, ethanol was constantly formed as condensate within the reaction mixture, and the boiling point of the reaction mixture therefore fell to about 120° C. within the period of 12 h. The reflux condenser was then replaced by distillation apparatus, composed of a 20 cm packed column, an inclined condenser, and a receiver, and the distillate formed during the reaction was removed. Once about 85 g of distillate had been transferred, the reaction mixture was cooled to 100° C., and a gas-inlet tube was provided, and the system was stripped at said temperature for about 1 h, using nitrogen. This process removed further residues of ethanol and of other volatile components. The product was then cooled and analyzed.

Analysis:
OH number: 85 mg KOH/g
GPC: Mn=4200 g/mol, Mw=14 500 g/mol (eluent: dimethylacetamide, calibration: PMMA)

Polyols 2 and 3 were analyzed as follows:

Polyols 2 and 3 were analyzed by gel permeation chromatography, using a refractometer as detector. The mobile phase used comprised tetrahydrofuran (THF) or dimethylacetamide (DMAc), and the standard used for molecular weight determination comprised polymethyl methacrylate (PMMA). OH number and acid number were determined to DIN 53240, part 2.

Polyol component A used is composed of 84.7 parts by weight of polyol 1, 5 parts by weight of polyol 2, 5 parts by weight of chain extender 1, 3 parts by weight of chain extender 2, 0.7 part by weight of catalyst, 0.1 part by weight of inhibitor, 0.1 part by weight of foam stabilizer, and 1.4 parts by weight of blowing agent.

Polyol component B used is composed of 85.8 parts by weight of polyol 1, 4.5 parts by weight of polyol 3, 4.4 parts by weight of chain extender 1, 3 parts by weight of chain extender 2, 0.7 part by weight of catalyst, 0.1 part by weight of inhibitor, 0.1 part by weight of foam stabilizer, and 1.4 parts by weight of blowing agent.

Experimental Work:

Reaction Mixture 1 (RM1):

100 parts by weight of polyol component A (45° C.) and 115 parts by weight of isocyanate (40° C.) were mixed with one another, using a low-pressure machine, and this mixture was discharged into a plastics bucket (5 L), to give the resultant open- and coarse-cell foam.

Reaction Mixture 2 (RM2):

100 parts by weight of polyol component B (45° C.) and 117 parts by weight of isocyanate (40° C.) were mixed with one another, using a low-pressure machine, and this mixture was discharged into a plastics bucket (5 L), to give the resultant open- and coarse-cell foam.

The mechanical properties of the resultant foam specimens were determined after 24 hours of ageing to DIN EN ISO 1798, 3386, 53573, 53504, 53512, and ISO 34-1, and these are listed in table 1.

Oil absorption was determined by internal methods:

Three different oils (heating oil, pyrolysis oil, and naphtha) were tested.

Method 1) "Straight Oil Absorption"

The foam was cut into cubes (1.4 g<weight<2 g), placed on the surface of the oil (100 mL of oil), and left there for 24 hours. Tongs were then used to remove the foam from the oil, and 5 seconds of drip time were allowed. The percentage increase in weight was then determined. Table 1 gives the average values from the two determinations.

$$\text{Increase in weight [g/g \%]} = \frac{\text{weight}_t - \text{weight}_0}{\text{weight}_0} \times 100$$

In the case of the heating oil, a further test was carried out to determine the percentage by weight of the oil that could be expelled from the sponge. For this, the foam cube comprising oil was placed in a Petri dish and squeezed with tongs. The amount of oil in the Petri dish was determined. The expelled oil was then weighed.

Method 2) Oil Absorption from Surface of Water and from a Water/Pyrolysis Oil Mixture 2a) Heating Oil and Naphtha 100 mL of water and 20 mL of oil were placed in a 200 mL glass beaker. The foam cube (1.4 g<weight<2 g) was then placed on the surface of the liquid. After one minute, the amount of liquid that had been absorbed was determined by the method described above. The foam was then squeezed and the liquid was placed in a measuring cylinder. The liquid exhibited no phase separation, even after 24 hours. This shows that the liquid expelled was composed entirely of oil.

2b) Pyrolysis Oil

The pyrolysis oil used comprised the residue from naphtha distillation. This oil has density 1.28 g/cm$^3$ and viscosity 860 mPas (23° C.). Since the density of the pyrolysis oil is >1 g/mL, it sinks to the floor of the vessel within the mixture of water (100 mL) and oil (20 mL). The foam cubes were therefore shaken for 1 minute with the water/oil mixture. The amount of liquid that had been absorbed was then determined.

TABLE 1

| Foam made of | RM1 |
|---|---|
| Density in g/dm$^3$ | 135 |
| Compressive strength at 40% compression in kPa | 13 |
| Tensile strength in kPa | 297 |
| Elongation at break in % | 303 |
| Tear propagation resistance in N/mm | 2.9 |
| Rebound resilience in % | 43 |
| Cell structure | coarse, open |
| Absorption of heating oil (% by weight) (method 1) | 215 |
| Expellable amount of heating oil (% by weight) | 88% |
| Absorption of pyrolysis oil (% by weight) (method 1) | 440 |
| Absorption of naphtha oil (% by weight) (method 1) | 215 |
| Absorption of liquid (% by weight) for pyrolysis oil/water mixture (method 2) | 310 |
| Absorption of liquid (% by weight) for naphtha oil/water mixture (method 2a) | 199 |
| Absorption of liquid (% by weight) for pyrolysis oil/water mixture (method 2b) | 310 |

The table shows that the foam specimen produced from the reaction mixture of the invention has not only the open and coarse cell structure but also very good mechanical properties. It is particularly the combination of high rebound resilience and high compressive strength that permits the use of the foam as oil-absorbing medium. The amount of oil absorbed here, within a very short time, can be more than 200% of the weight of the material itself, for a density of 135 g/dm$^3$.

The invention claimed is:

1. A method for absorbing hydrophobic liquids comprising oil on the surface of an oil-contaminated body of water, comprising contacting the hydrophobic liquid on the surface of the body of water with a polyurethane sponge with a density from 70 to 300 g/dm$^3$, with from 1 to 20 cells/cm, with a rebound resilience greater than 30%, with an elongation at break greater than 200%, with a tear propagation resistance greater than 1.2 N/mm, with a compressive strength greater than 4 kPa when measured at 40% compression, and with a tensile strength greater than 200 kPa, and wherein the polyurethane sponge comprises hydrophobic groups.

2. The method according to claim 1, where the polyurethane foam is obtained via mixing of
   a) compounds which have isocyanate groups and which are based on a1) MDI and optionally on a2) polyetherols, and/or on a3) polyesterols, and also optionally a4) chain extender, where the content of MDI having a functionality greater than 2 is smaller than 30% by weight, based on the total weight of the MDI a1), b) compounds having groups reactive toward isocyanate, comprising polyetherols and/or polyesterols, c) blowing agent comprising water, and also optionally, d) chain extender, e) catalyst, and also f) other auxiliaries and/or additives to give a reaction mixture, and permitting completion of the reaction to give the polyurethane foam, where the compound b) used comprises a mixture comprising polyester polyol and hyperbranched polyester, where the hyperbranched polyester is obtained via reaction of at least one dicarboxylic acid or of derivatives of the same with s1) at least one at least trifunctional alcohol ($B_3$), or t1) at least one difunctional alcohol ($B_2$) and at least one x-functional alcohol ($C_x$) which has more than two OH groups, where x is a number greater than 2, and where the average functionality of the entire mixture of the alcohols used is from 2.1 to 10, or via reaction of at least one polycarboxylic acid ($D_y$) or derivative thereof which has more than two acid groups, where y is a number greater than 2, with s2) at least one at least difunctional alcohol ($B_2$), or t2) at least one difunctional alcohol ($B_2$) and at least one x-functional alcohol ($C_x$) which has more than two OH groups, where x is a number greater than 2, where u) the reaction optionally includes up to 50 mol %, based on the alcohols $B_3$, $B_2$, and/or $C_x$ reacted as in s1), s2), t1), and t2), of a hydrophobic long-chain monofunctional alcohol $E_1$ having at least 8 carbon atoms, and v) there is optionally subsequent reaction with a long-chain hydrophobic monocarboxylic acid having at least 8 carbon atoms, where one or more of the following conditions is/are fulfilled:

i) the alcohol $B_3$ and, respectively, $B_2$, and/or $C_x$ is a hydrophobic alkoxylate based on propylene oxide, butylene oxide, or styrene oxide having an average of at least 1 and at most 100 oxyalkylene units per starter molecule, and having a difunctional (for $B_2$), trifunctional (for $B_3$), or x-functional (for CO starter molecule;

ii) the alcohols $B_3$ and, respectively, $B_2$ and/or $C_x$ comprise at least 20 mol % of a long-chain diol or, respectively, polyol having at least 8 carbon atoms;

iii) the dicarboxylic acid is a hydrophobic long-chain aliphatic dicarboxylic acid, or an aromatic or cycloaliphatic dicarboxylic acid having at least 8 carbon atoms and, respectively, the carboxylic acid $D_y$ having more than two acid groups is a hydrophobic long-chain aliphatic polycarboxylic acid, or an aromatic or cycloaliphatic polycarboxylic acid having at least 9 carbon atoms;

iv) the reaction also includes at least 10 mol % and at most 90 mol % based on the alcohols $B_3$, $B_2$, and/or $C_x$ reacted as in s1), s2), t1), and t2), of a long-chain monoalcohol $E_1$ having at least 8 carbon atoms;

v) subsequent reaction takes place with from 10 to 100 mol % based on the average number of the OH groups of the hyperbranched polyester, of a long-chain hydrophobic monocarboxylic acid having at least 8 carbon atoms.

3. The method according to claim 2, wherein i) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group, and iii) reacting the product from i) with a hydrophobic long-chain aliphatic dicarboxylic acid, with an aromatic or cycloaliphatic dicarboxylic acid having at least 8 carbon atoms, or with a hydrophobic long-chain aliphatic polycarboxylic acid, or with an aromatic or cycloaliphatic polycarboxylic acid $D_y$ having more than two acid groups and having at least 9 carbon atoms.

4. The method according to claim 3, wherein the reaction is carried out with a long-chain aliphatic dicarboxylic acid having at least 8 carbon atoms or with a hydrophobic long-chain aliphatic polycarboxylic acid having at least 9 carbon atoms.

5. The method according to claim 2, wherein i) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group, and iv) the reaction includes at least 10 mol % and at most 90 mol %, based on the alcohols $B_3$, $B_2$, and/or $C_x$ reacted as in s1), s2), t1), and t2), of a long-chain monoalcohol having at least 8 carbon atoms.

6. The method according to claim 2, wherein i) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group, and v) the reaction product of s1) and t1) and, respectively, s2) and t2) is then reacted with from 10 to 100 mol %, based on the average number of the OH groups of the hyperbranched polyester, of a long-chain hydrophobic monocarboxylic acid F having at least 8 carbon atoms.

7. The method according to claim 1, where the polyurethane foam is obtained via mixing of a) compounds which have isocyanate groups and which are based on a1) MDI and optionally a2) polyetherols, and/or a3) polyesterols, and also optionally a4) chain extender, where the content of MDI having a functionality greater than 2 is smaller than 30% by weight, based on the total weight of the MDI a1), b) compounds which have groups reactive toward isocyanate and which comprise polyetherols and/or polyesterols, c) blowing agent comprising water, and also optionally, d) chain extender, e) catalyst, and also f) other auxiliaries and/or additives to give a reaction mixture, and permitting completion of the reaction to give the polyurethane foam, where the compound b) used comprises a mixture comprising polyester polyol and hyperbranched polycarbonate, where the hyperbranched polycarbonate is obtained via reaction of at least one carbonic ester ($A_2$) or of derivatives of the same with l) at least one at least trifunctional alcohol ($B_3$), or m) at least one difunctional alcohol ($B_2$) and at least one x-functional alcohol (CO which has more than two OH groups, where x is a number greater than 2, and where the average functionality of the entire mixture of the alcohols used is from 2.1 to 10, where n) the reaction can also include up to 50 mol % based on the alcohols $B_3$, $B_2$, and/or $C_x$ reacted as in l) and m), of a hydrophobic long-chain monofunctional alcohol $E_1$ having at least 8 carbon atoms, and o) there is optionally subsequent reaction with a long-chain hydrophobic OH-reactive compound F, p) there is optionally subsequent reaction with propylene oxide and/or butylene oxide, where one or more of the following conditions is/are fulfilled:

I) the alcohol $B_3$ and, respectively, $B_2$, and/or $C_x$ is a hydrophobic alkoxylate based on propylene oxide, butylene oxide, or styrene oxide having an average of at least 1 and at most 100 oxyalkylene units per starter molecule, and having a difunctional (for $B_2$), trifunctional (for $B_3$), or x-functional (for $C_x$) starter molecule;

II) the alcohols $B_3$ and, respectively, $B_2$ and/or $C_x$ comprise at least 20 mol % of a long-chain diol or, respectively, polyol having at least 8 carbon atoms;

III) the reaction includes at least 10 mol % and at most 90 mol % based on the alcohols $B_3$, $B_2$, and/or $C_x$ reacted as in l) and m), of a long-chain monoalcohol having at least 8 carbon atoms;

IV) subsequent reaction takes place with from 10 to 100 mol % based on the average number of the OH groups of the hyperbranched polycarbonate, of the long-chain hydrophobic OH-reactive compound F having at least 8 carbon atoms, V) there is subsequent reaction with, per equivalent of OH groups of the hyperbranched polycarbonate, from 1 to 60 equivalents of propylene oxide or butylene oxide, or propylene oxide and butylene oxide.

8. The method according to claim 7, wherein
the alcohol $B_3$ and, respectively, $B_2$, and/or $C_x$ is a hydrophobic alkoxylate which is based on propylene oxide or butylene oxide and which has an average of from 1 to 15 oxyalkylene units per OH group.

9. The method according to claim 7, wherein
I) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group, and III) the reaction includes at least 10 mol % and at most 90 mol %, based on the alcohols $B_3$, $B_2$, and/or $C_x$ reacted as in g) and h), of a long-chain monoalcohol $E_1$ having at least 8 carbon atoms.

10. The method according to claim 7, wherein
I) the alcohol $B_3$ and, respectively, $B_2$, and/or $C_x$ is a hydrophobic alkoxylate which is based on propylene oxide or butylene oxide and which has an average of from 1 to 15 oxyalkylene units per OH group, and IV) the reaction product of l) and m) is then reacted with from 10 to 100 mol %, based on the average number of the OH groups of the hyperbranched polyester, of a long-chain hydrophobic OH-reactive compound $F_1$ having at least 8 carbon atoms.

11. The method according to claim 1, wherein the polyisocyanate A used comprises a compound based on a1) MDI and a2) polyesterol.

12. The method according to claim 1, wherein the compounds used which have groups reactive toward isocyanate comprise, alongside the hyperbranched polyester or the hyperbranched polycarbonate, exclusively one or more polyesterols.

13. The method according to claim 1, where the hydrophobic liquid is crude oil.

14. The method according to claim 1, wherein the polyurethane foam is added to an oil-contaminated body of water.

15. The method according to claim 1, wherein the hydrophobic liquid is an oil.

16. The method according to claim 1, wherein the oil that is absorbed by the polyurethane sponge is not released into the body of water by wave action.

* * * * *